Patented Sept. 23, 1952

2,611,714

UNITED STATES PATENT OFFICE 2,611,714

WET PROCESS FOR PORTLAND CEMENT MANUFACTURE

Joshua Chitwood Witt, Chicago, Ill.

No Drawing. Application April 14, 1948,
Serial No. 21,094

8 Claims. (Cl. 106—100)

The invention relates to the manufacture of Portland type cements, and has for its object the improvement of the well known wet process widely employed in this connection.

In the commercial manufacture of such cements, the raw solid materials are reduced to a state of fine sub-division in either of two ways, commonly known respectively as the "dry process" and the "wet process." Since each of these is well known in the art they will not be described in detail, beyond saying that as the names imply, in the dry process the raw materials are ground in a substantially dry state, and thus reduced to a powdered condition, while in the wet process the reduction is accomplished in the presence of water and results in a flowable suspension of the finely divided solids in the liquid, known as "slurry."

The wet process has a number of important advantages, among them being the fact that a suspension of finely ground solids in a liquid may be transported, stored, and blended much more readily than can similar finely ground solids not suspended in a liquid. This brings about many economies in the process and facilitates the production of a uniform kiln feed.

The wet process also has certain disadvantages. For example, a slurry in storage must be agitated continuously by compressed air, mechanical stirrers, or both, to prevent setting of the solids, and even then it is not always possible completely to avoid setting. Again, it is desirable to add to the slurry dust precipitated from the kiln gases, but since this dust tends to facilitate the setting of the slurry, other methods for handling the dust, which are less economical and less convenient, commonly are employed. In localities where below-freezing temperatures are encountered, provision must be made for preventing the freezing of the slurry. Water of course also encourages the rusting of iron or steel equipment used.

The principal disadvantage of the wet process is the large quantity of heat required to evaporate the water carried by the raw materials solids when they enter the kiln. Heat is required to raise the temperature of such water to 212° F., to evaporate the water from and at 212° F., and to superheat the steam to the temperature of the exit gases of the kiln. The heat requirements are large because of the high specific heat of water and the high latent heat of vaporization of water.

From the time the wet process came into use in the cement industry, many devices and procedures for improving economy have been introduced. For example, it has been proposed:

1. To retard or prevent setting of slurry by the addition of small quantities of certain known inhibiting materials, such as dextrin.

2. To introduce small quantities of some materials such as sodium and potassium salts, sugar, soaps, gelatin and glycols, which when dissolved in the water of the slurry increase the fluidity of the slurry, thus permitting the use of a smaller percentage of water to obtain a slurry of a given viscosity.

3. To remove a large portion of the water from the slurry by filtering or by centrifuging which, of course, decreases the water to be evaporated in the kiln. Because of installation and operation costs, such equipment is not universally employed at wet process plants.

Heat transfer considerations have led to major increases in the lengths of wet process kilns, the installation of systems of chains, and other auxiliary equipment for facilitating heat transfer.

There is a definite basis for the disadvantages of the wet process. These disadvantages, the economy measures that have been mentioned, and the limited improvements that have been obtained are due to the chemical and physical properties of water. Fundamentally, because of these properties, water is not a suitable liquid for the purpose.

The present invention provides a procedure for retaining the advantages and eliminating the disadvantages of the wet process. This is accomplished by substituting for water an organic, non-aqueous liquid which is chemically inert, with respect to the solid materials to be ground, and is not deliquescent to any appreciable extent; or a mixture of such liquids. The liquid or liquids should have the following physical properties:

Specific heat_____ Less than 1.
Boiling point_____ 200° F. to 900° F.
Latent heat of vaporization. Less than 900° B. t. u.
Heat content of the vapor, Less than 1,000 B. t. u.
  at 900° F. and at 1 atmosphere.

If two or more such liquids are used, they should be miscible as regards one another.

Petroleum distillate #1 may be mentioned as a typical example of liquid suitable for carrying on the process. Since this, as well as any other liquids having the properties above set forth as adapting them to use in the process, obviously are more expensive than the water heretofore commonly used, provision is made for the recovery of substantially all of the liquids, and their re-use, whereby the make-up requirements to cover losses are relatively small. Since at least 30% of the liquid may be withdrawn from the top of the slurry within a few hours of its being permitted to become quiescent, decantation provides an economical method of recovering a considerable portion of the liquid. Distillation, employing waste heat from the kilns or other units of the plant, may be used to recover substantially all of the remainder. Filtration and centrifuging may also be utilized, if desired.

All of the steps of the present process up to and including the separation of the liquid and solid constituents of the slurry may be carried out through the use of well known standard equipment, much of it already employed in performing like operations in the old wet process and/or in other fields, such as oil refining; and subsequent to the separation the solids may be handled by substantially the same equipment and procedures that have been heretofore used in connection with materials prepared by the dry process. Thus, the practice of the present invention does not necessarily call for the design or use of any new apparatus.

In carrying out the invention in connection with the manufacture of Portland cements, the raw materials are preliminarily dried if necessary, which in most cases may be effectively and economically accomplished by the use of waste heat, e. g., from the kilns. In some instances the liquid content of the raw materials may be such that this preliminary drying can be dispensed with. The dry materials are ground in any appropriate form of mill or other grinding apparatus, but in the absence of water but in the presence of the organic non-aqueous liquid or liquids above described, to produce a slurry composed of from say 60% to 70% of finely divided solids and from 40% to 30% of liquid or liquids. When the grinding has been completed the slurry is pumped or otherwise transferred to storage tanks, in which it may be retained for indefinite periods without danger of freezing, or setting of the solids. The slurry may be pumped from the tanks as required, and if necessary, slurries having two or more different compositions may be readily blended in any proportions necessary to provide a raw mix which, when clinkered, will produce a cement having any specified properties. The slurry or mixture of slurries then has all or a major portion of the liquid separated from the solids in any of the manners above indicated, after which the solids may be handled, transported, introduced into the kilns and clinkered in the usual manner of the dry process.

If the liquid is combustible, as in the case of the petroleum distillate above mentioned, any portions thereof remaining with the solids when introduced into the kilns will be ignited and furnish part of the heat required for the clinkering operation.

The invention is also applicable to the grinding of cement clinker as it comes from the kilns. Heretofore it has been impractical to wet-grind such clinker, for obviously if water were present during such grinding operation, it would initiate the chemical reactions which produce the setting of the cement. However, by carrying out the grinding step in the presence of a non-aqueous liquid or liquids as above set forth, the clinker may be comminuted with all of the advantages of wet grinding. Of course, substantially all of the liquid is removed from the mixture at the conclusion of the grinding operation so as not to impair the hydraulic properties of the cement. If a trace of the liquid remain it is beneficial by imparting some water repellency to the cement, thereby tending to inhibit warehouse set.

Wet-grinding of clinker in this manner will greatly facilitate the admixture therewith of substances such as color pigments, water-proofing compounds, plasticizers, hardeners, etc., as these may be more readily and uniformly incorporated into the cement during the grinding of the clinker in the presence of a liquid than when introduced into a dry powder. For a given result, the quantity of such substances needed will be less than when introduced dry; and if they happen to be soluble in the non-aqueous liquid, still more satisfactory and economical results will follow.

While the invention is intended primarily for the manufacture of Portland cement by the wet process, the wet-grinding of raw materials in the presence of an organic non-aqueous liquid in the place of water may also find application in the making of other finely ground products, such for example as lime, paint pigments, etc.

What is claimed is:

1. In the manufacture of Portland cement by the "wet" process without the use of water, the steps which comprise comminuting substantially dry cement-making solids in an organic water-free liquid which is chemically inert as regards said solids, to produce a slurry consisting of the comminuted solids and said liquid; and segregating the components of the slurry while continuously excluding water therefrom.

2. In the manufacture of Portland cement by the "wet" process without the use of water, the steps which comprise comminuting substantially dry cement-making solids in an organic, water-free liquid which is chemically inert as regards said solids, and which has a specific heat of less than 1, a boiling point of from 200° F. to 900° F., a latent heat of vaporization of less than 900 B. t. u., and a vapor heat content of less than 1,000 B. t. u. at 900° F. and a pressure of 1 atmosphere, whereby to form a semi-fluid mixture consisting of the comminuted solids and said liquid; and separating the components of said mixture while continuously excluding water therefrom.

3. In the manufacture of Portland cement by the "wet" process without the use of water, the steps which comprise comminuting substantially dry cement-making solids in a water-free liquid petroleum fraction to form a slurry consisting of the finely divided solids and said petroleum fraction, such fraction having a specific heat of less than 1, a boiling point of from 200° F. to 900° F., a latent heat of vaporization of less than 900 B. t. u., and a vapor heat content of less than 1,000 B. t. u. at 900° F. and a pressure of 1 atmosphere; and separating the comminuted solids from the liquid petroleum fraction while continuously excluding water therefrom.

4. In the manufacture of hydraulic cement, the steps which comprise comminuting substantially dry Portland cement-making material solely in #1 petroleum distillate to form a water-free semi-fluid mixture consisting of the finely divided material and said distillate; and separating the comminuted material from the distillate while continuously excluding water from the mixture and the separated components.

5. In the manufacture of hydraulic cement by the "wet" process without the use of water, the steps which consist in comminuting dehydrated raw Portland cement-making solids solely in water-free liquid which is chemically inert as regards said solids, whereby to form a slurry consisting of the finely divided solids and said liquid; decanting the slurry to remove a substantial portion of the liquid; subsequently separating and recovering the remaining liquid from the solids while continuously excluding water therefrom; and clinkering the separated solids.

6. In the manufacture of hydraulic cement by the "wet" process without the use of water, the steps which comprise comminuting substantially dry Portland cement-making raw materials solely in an organic water-free liquid which is chemically inert as regards the materials, whereby to produce a water-free semi-fluid mixture consisting of the finely divided solids and said liquid; transporting and storing the materials in said semi-fluid form until needed; continuously excluding water from the mixture and separating substantially all of the liquid from the solids preparatory to clinkering the latter; and clinkering the separated solids.

7. In the manufacture of hydraulic cement, the steps which consist in comminuting dehydrated raw Portland cement-making solids in an organic, water-free, combustible liquid which is chemically inert as regards said solids, to form a slurry consisting of the finely divided solids and said liquid; continuously excluding water from the slurry while separating and recovering at least the major portion of the liquid from the slurry; and clinkering the separated solids, with any of the combustible liquid remaining therein igniting and furnishing a portion of the heat for the clinkering operation.

8. In the manufacture of hydraulic cement, the steps which comprise comminuting Portland cement clinker in an organic water-free liquid which is chemically inert as regards the clinker, to produce a water-free semi-fluid mixture of the finely divided clinker in said liquid; and continuously excluding water from the mixture while separating the components thereof and recovering substantially all of the liquid.

JOSHUA CHITWOOD WITT.

REFERENCES CITED

The following references are of record in the file of this patent:

UNITED STATES PATENTS

| Number | Name | Date |
|---|---|---|
| 1,955,121 | Folke | Apr. 17, 1934 |
| 2,270,870 | Ditto et al. | Jan. 27, 1942 |
| 2,274,766 | Ziehl | Mar. 3, 1942 |
| 2,337,671 | Linford | Dec. 28, 1943 |